May 17, 1927.
C. H. W. EDMONDS
1,628,714
ILLUMINATED RAILWAY SIGNAL
Filed Feb. 24, 1925
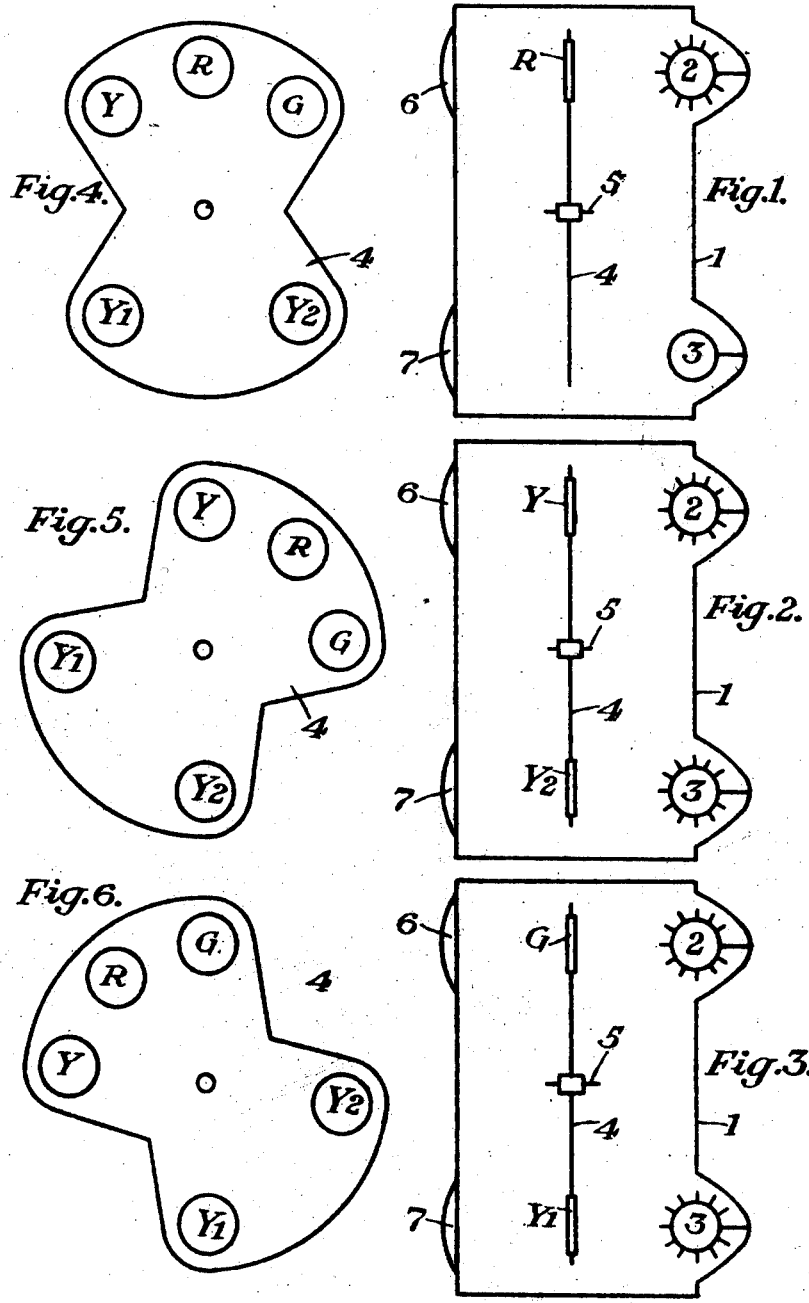
INVENTOR:
C. H. W. Edmonds,
BY
A. L. Vencill
His ATTORNEY Patented May 17, 1927.

1,628,714

UNITED STATES PATENT OFFICE.

COURTENAY HAROLD WISH EDMONDS, OF LONDON, ENGLAND, ASSIGNOR, BY MESNE ASSIGNMENTS, TO THE UNION SWITCH & SIGNAL COMPANY, OF SWISSVALE, PENNSYLVANIA, A CORPORATION OF PENNSYLVANIA.

ILLUMINATED RAILWAY SIGNAL.

Application filed February 24, 1925, Serial No. 11,050, and in Great Britain March 13, 1924.

My invention relates to railway signals of the illuminated or light type in which the various signal indications are given by means of beams of light of different colors obtained by the interposition of one or other of a number of differently colored screens in the beam of light emitted by the signal lamp.

In accordance with the usual practice these screens are mounted in a spectacle or vane adapted to be displaced so as to bring the desired color screen into position in front of the source of light, the adjustment of the spectacle or vane for this purpose being effected by any suitable control mechanism.

In recent developments of signaling systems embodying illuminated signals it has been proposed to utilize multiple aspect signals, that is to say, signals in which two or more light signals of different colors are simultaneously exhibited for the purpose of obtaining a greater number of different signal indications. For instance, in addition to the usual three-aspect light signals in which a red light indicates "danger," a yellow light "caution," and a green light "safety," it is proposed to utilize intermediate indications, such as the combination of a yellow light and green light to impose a more restrictive condition upon traffic than a green light only, and the combination of two yellow lights to indicate that a greater degree of caution must be observed than with the combination of a yellow light and a green light.

This interpolation of two additional signal aspects between "safety" and "caution" is of great advantage in cases in which the section of track is traversed by trains of widely different running speeds, as the signals giving intermediate aspects may be safely passed by a slow train capable of being brought to rest within a relatively short distance, while on the other hand the driver of a fast train will be informed by the intermediate aspect signals that a "caution" signal is being given at a distance ahead sufficiently great to permit the speed of running to be controlled accordingly.

My invention has for its object to provide arrangements whereby these additional signal indications may be obtained in a simple and economical manner.

According to my present invention, the spectacle or vane or a portion or extension thereof is provided with additional color screens adapted to co-operate with an additional signal lamp, these additional color screens being so arranged that when an intermediate signal indication is to be given both signal lamps are illuminated, and the spectacle is adjusted to such a position that the beams of light from these lamps traverse screens of suitable colors. The single aspect or primary signal indications are given in the usual manner by one of the signal lamps only, so that the signal indication given will depend not only upon the position of the spectacle or vane but also upon whether one or both of the signal lamps is illuminated.

My invention is illustrated in the accompanying drawings.

Figs. 1, 2 and 3 of which are diagrammatic sectional views of an illuminated color signal arranged in accordance with one form of the invention, the several figures illustrating different signal indications.

Figs. 4, 5 and 6 are front views of the vane shown in Figs. 1, 2 and 3 for the corresponding signal indications.

Referring now to the drawings, it will be seen that the signal comprises a casing 1 provided with two signal lamps 2, 3 and a vane 4 pivotally mounted at 5, so as to be capable of rotation in a plane parallel to the plane of the lamps 2, 3. The front of the casing 1 is provided with the usual projecting lenses diagrammatically indicated at 6, 7 for the signal lamps 2, 3 respectively.

The vane 4 as shown more clearly in Figs. 4, 5 and 6 is provided with a number of transparent color screens, a red color screen R being centrally arranged in the upper portion of the vane with a yellow color screen Y on one side thereof and a green color screen G on the other side. The lower portion of the van is provided with two transparent color screens $Y'$ and $Y^2$, the screen $Y'$ being diametrically opposite to the screen G, and the screen $Y^2$ being diametrically opposite to the screen Y.

In operation the color screens Y, R and

G in the upper portion of the vane 4 are employed for giving the usual single aspects or primary signal indications. In the position of the vane shown in Figs. 1 and 4 for instance, the red color screen R is interposed between the lamp 2 and the projecting lens 6 so that a red signal beam constituting a "danger" signal is projected under these conditions. By rotating the vane 4 to the right to the position shown in Fig. 5, the yellow color screen Y will evidently be interposed between the signal lamp 2 and the projecting lens 6, so that a yellow signal base serving as a "caution" signal indication will be projected. On the other hand, by rotating the vane 4 towards the left to the position shown in Fig. 6 the green color screen G is interposed between the signal lamp 2 and the projecting lens 6, so that a green signal beam constituting a "proceed" signal indication is projected.

It will be understood that for these three primary or single aspect signal indications the signal lamp 2 only is illuminated, as shown conventionally in Fig. 1 the other signal lamp 3 being unilluminated.

In order to give a secondary signal indication which is less restrictive than the yellow primary signal aspect the vane 4 may be arranged to occupy the position shown in Fig. 5 both the signal lamps 2 and 3, however, being illuminated as indicated in Fig. 2. Under these conditions, a double yellow beam will evidently be projected from the signal, viz, a yellow beam from the lamp 2 through the color screen Y and the projecting lens 6, and a second yellow beam from the signal lamp 3 through the color screen $Y^2$ and the projecting lens 7.

A still less restrictive secondary signal aspect will be exhibited if the vane 4 occupies the position shown in Fig. 6, both signal lamps being illuminated as shown in Fig. 3. In this case a green signal beam will be projected from the lamp 2 through the color screen G and the projecting lens 6, and a yellow beam from the lamp 3 through the color screen Y' and the projecting lens 7.

The two secondary signal aspects above described consisting of two yellow beams and a green and a yellow beam respectively, are thus intermediate aspects between the primary yellow or "caution" aspect and the primary green or "proceed" aspect, so that by the employment of two signal lamps five different signal aspects can be obtained.

It will be understood that the vane 4 may be arranged to be adjusted to the various positions above described in any suitable manner, as, for instance, by mechanically or otherwise coupling the vane 4 to one or more semaphore arms, the illumination of the additional signal lamp 3 employed when secondary signal aspects are required being arranged to be suitably controlled as will be obvious to those skilled in the art.

In a modified arrangement the primary color screens Y, R and G may be constituted by ordinary signal spectacle usually employed in railway signaling, the additional color screens Y' and $Y^2$ being mounted in an extension of the spectacle or in a separate vane or spectacle which is arranged to be operated in conjunction with the main spectacle, the additional signal lamp 3 being suitably mounted so as to obtain the action above described.

It will be evident that the invention is not limited to any particular combination or arrangement of the various color screens nor to any particular construction of the vane or spectacle and its operating mechanism and variations in these and other respects may obviously be made without exceeding the scope of my invention.

Having now particularly described and ascertained the nature of my said invention and in what manner the same is to be performed, I declare that what I claim is:

1. A railway light signal adapted to give single or double signal light indications comprising a main lamp and an auxiliary lamp, and a movable spectacle provided with main color screens co-operating with said main lamp and with auxiliary color screens co-operating with certain of said main color screens when said auxiliary lamp is lighted.

2. A railway light signal comprising a main lamp and an auxiliary lamp, a movable spectacle provided with a plurality of main color screens co-operating with said main lamp to give a corresponding number of primary indications according to the position of the spectacle, said spectacle also having auxiliary color screens co-operating with said auxiliary lamp to modify the primary indications given by said main color screens when said auxiliary lamp is lighted.

3. A railway light signal comprising a main lamp, a spectacle movable in opposite directions from a middle position and provided with a red screen which registers with said lamp when the spectacle is in its middle position, said spectacle also having a yellow screen and a green screen one or the other of which registers with said lamp according as the spectacle is moved in one direction or the other from its middle position, an auxiliary lamp, and two auxiliary yellow screens carried by said spectacle and one or the other of which registers with said auxiliary lamp according as the spectacle is moved in one direction or the other from its middle position.

4. A railway light signal comprising primary and secondary light producing means, and a movable spectacle having two series of color screens co-operating with said light producing means to produce single or double light signal indications.

5. In a railway light signal comprising a constant source of light, a spectacle having a series of color screens mounted to co-operate with said light to give a corresponding number of primary signal indications, a variable source of light, said spectacle having a second series of color screens mounted to co-operate with said variable source of light to give a corresponding number of modifying signal indications simultaneously with certain of said primary signal indications when said variable source of light is lighted.

In testimony whereof I affix my signature.

COURTENAY H. W. EDMONDS.